United States Patent
Sekihara et al.

(10) Patent No.: US 10,421,353 B2
(45) Date of Patent: Sep. 24, 2019

(54) FUEL SUPPLY APPARATUS

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Atsushi Sekihara, Kiyosu (JP); Yoshinari Hiramatsu, Kiyosu (JP); Shinji Shimokawa, Seto (JP); Toru Shirasaki, Nisshin (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 517 days.

(21) Appl. No.: 15/262,060

(22) Filed: Sep. 12, 2016

(65) Prior Publication Data
US 2017/0087981 A1    Mar. 30, 2017

(30) Foreign Application Priority Data
Sep. 28, 2015    (JP) .................. 2015-189589

(51) Int. Cl.
*B60K 15/04* (2006.01)
*B60K 15/035* (2006.01)

(52) U.S. Cl.
CPC ............ *B60K 15/04* (2013.01); *B60K 15/035* (2013.01); *B60K 2015/03538* (2013.01); *B60K 2015/03576* (2013.01); *B60K 2015/047* (2013.01)

(58) Field of Classification Search
CPC .................. B60K 15/04; B60K 15/035; B60K 2015/03538; B60K 2015/03576; B60K 2015/047
USPC ........................................................ 220/86.2
See application file for complete search history.

(56) References Cited

U.S. PATENT DOCUMENTS

| | | | |
|---|---|---|---|
| 8,220,508 B2 | 7/2012 | Rongstock | |
| 2002/0134461 A1* | 9/2002 | Furuta | B60K 15/04 141/286 |
| 2009/0084464 A1 | 4/2009 | Hagano | |

FOREIGN PATENT DOCUMENTS

| | | |
|---|---|---|
| JP | 2002-283855 A | 10/2002 |
| JP | 2009-083569 A | 4/2009 |
| JP | 2010-195062 A | 9/2010 |
| JP | 2012-116380 A | 6/2012 |
| JP | 2015-143043 A | 8/2015 |

* cited by examiner

*Primary Examiner* — King M Chu
(74) *Attorney, Agent, or Firm* — Posz Law Group, PLC

(57) ABSTRACT

A fuel supply apparatus comprises a filler neck body including a hollow fuel passage-forming structure configured to form a fuel passage and a fuel vapor port branched off from the fuel passage-forming structure; and a nozzle guide formed in a tubular shape to introduce a fueling nozzle. The nozzle guide includes a vapor flow path portion configured to introduce fuel vapor flowing into the fuel vapor port in a tank direction. The vapor flow path portion has a slow-down portion configured to slow down the fuel vapor introduced in the tank direction.

5 Claims, 9 Drawing Sheets

FUEL SUPPLY APPARATUS

CROSS-REFERENCE TO RELATED APPLICATION

The present application claims priority based on Japanese patent application No. 2015-189589 filed on Sep. 28, 2015, the disclosure of which is hereby incorporated by reference into this application.

BACKGROUND

Field

The disclosure relates to a fuel supply apparatus.

Related Art

A fuel supply apparatus has been conventionally known to introduce a liquid fuel supplied from a fueling nozzle to a fuel tank of a motor vehicle. For example, JP 2009-83569A describes a fuel supply apparatus comprising a breather port that is provided separately from a fuel passage which a liquid fuel supplied from a fueling nozzle to a fuel tank passes through and is configured to circulate fuel vapor generated by vaporization of the liquid fuel in the fuel tank between the fuel supply apparatus and the fuel tank. JP 2015-143043A describes a filler pipe configured to receive a supplied liquid fuel and have ribs that are formed on an outer circumferential surface of a tubular retainer mounted to inside of the filler pipe to be protruded on a normal line of the outer circumferential surface and extended in the circumferential direction in the fuel tank direction where the fuel tank is placed.

The fuel vapor flowing from the fuel tank through the breather port to the fuel supply apparatus joins with the liquid fuel supplied from the fueling nozzle during fueling. There is a demand to cause the fuel vapor to smoothly join with the supplied liquid fuel, with a view to preventing the fuel vapor from flowing out of the motor vehicle when the fuel vapor joins with the supplied liquid fuel in the fuel supply apparatus. The fuel supply apparatus described in JP 2009-83569A, however, has a likelihood that the fuel vapor does not smoothly join with the supplied liquid fuel. There is accordingly still a room for improvement with regard to the configuration of the fuel supply apparatus. The filler pipe described in JP 2015-143043A has a significant difference between the diameter of the breather pipe and the dimension between the ribs protruded on the normal line. The filler pipe allows the fuel vapor flowing through the breather pipe into the filler pipe to be introduced in the fuel tank direction where the fuel tank is placed. This configuration, however, does not sufficiently achieve the demand to cause the fuel vapor to smoothly join with the supplied liquid fuel.

SUMMARY

According to one aspect, there is provided a fuel supply apparatus. The fuel supply apparatus comprises a filler neck body including a hollow fuel passage-forming structure configured to form a fuel passage that a supplied fuel passes through, and a fuel vapor port branched off from the fuel passage-forming structure; and a nozzle guide located inside of the filler neck body and formed in a tubular shape to introduce a fueling nozzle that is inserted into a main body opening of the filler neck body and provided to supply the fuel, in a tank direction from the main body opening of the filler neck body toward a fuel tank. The nozzle guide includes a vapor flow path portion configured to introduce fuel vapor flowing into the fuel vapor port in the tank direction. The vapor flow path portion has a slow-down portion configured to slow down the fuel vapor introduced in the tank direction.

DESCRIPTION OF EMBODIMENTS

A. First Embodiment (1) General Configuration of Fuel Supply Apparatus FS

Figure 1:
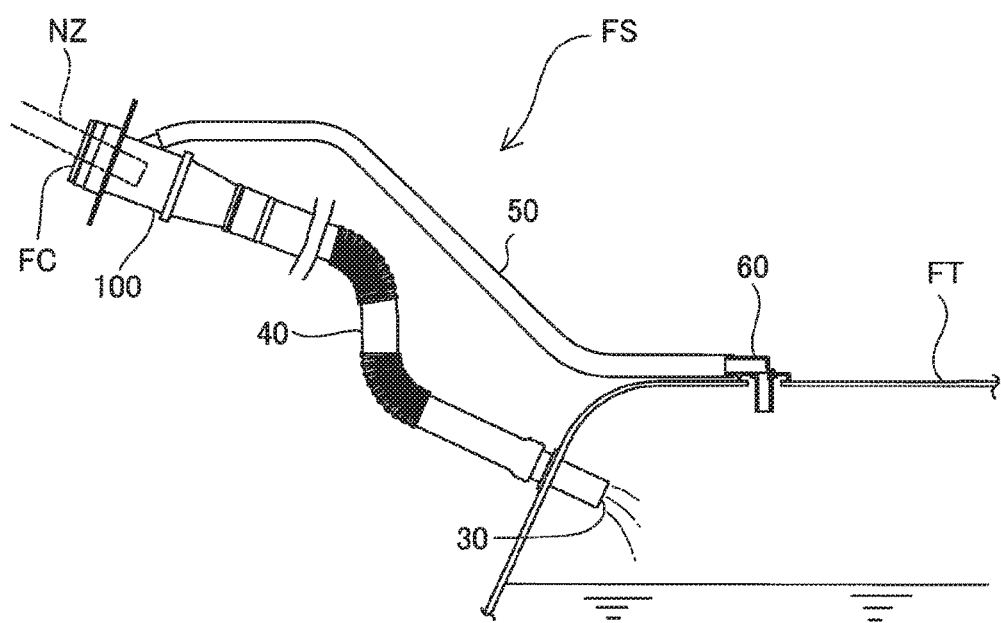
FIG. 1 is a schematic diagram illustrating a fuel supply apparatus configured to connect a fueling nozzle for supplying a fuel with a fuel tank mounted inside of a motor vehicle.

FIG. 1 is a schematic diagram illustrating a fuel supply apparatus FS configured to connect a fueling nozzle NZ for supplying a fuel with a fuel tank FT mounted inside of a motor vehicle. The fuel supply apparatus FS includes a filler neck 100, a filler tube 40, a breather pipe 50, a flow control valve 60 and a check valve 30. The filler neck 100 and the fuel tank FT are connected by the filler tube 40 and the breather pipe 50. The filler tube 40 is connected with the fuel tank FT via the check valve 30. The breather pipe 50 is connected with the fuel tank FT via the flow control valve 60, The breather pipe 50 is located above the filler tube 40 in the vertical direction, so that the supplied fuel passes through the filler tube 40 and does not flow into the breather pipe 50. The fuel vapor generated by vaporization of the fuel in the fuel tank FT flows from the fuel tank FT through the breather pipe 50 and is returned to a fuel passage formed in the filler neck 100. The direction from the filler neck 100 toward the fuel tank FT corresponds to the tank direction in the claims. In the description below, the direction from the filler neck 100 toward the fuel tank FT may be simply called "downstream direction" or "downstream side", and the opposite direction may be called "upstream direction" or "upstream side".

Figure 2A:
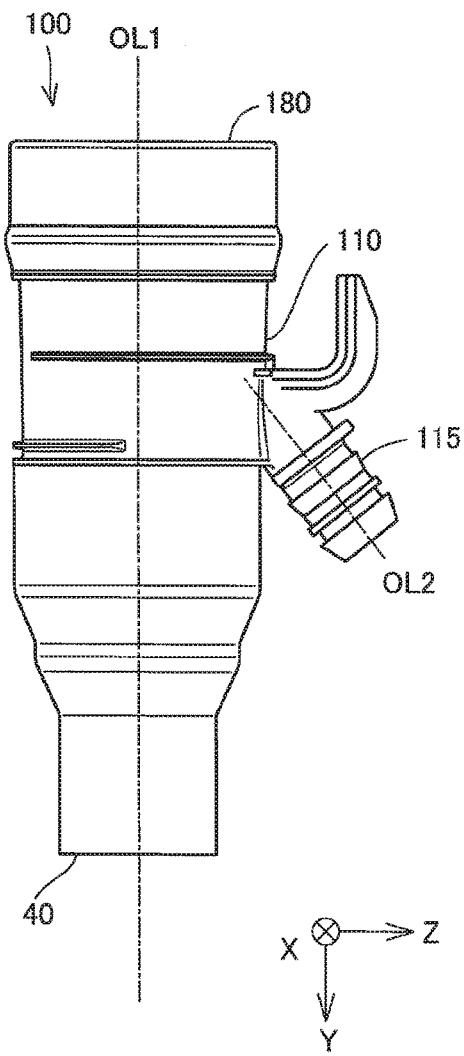
FIGS. 2A and 2B are appearance diagrams illustrating a filler neck with which a filler tube is connected.
Figure 2B:
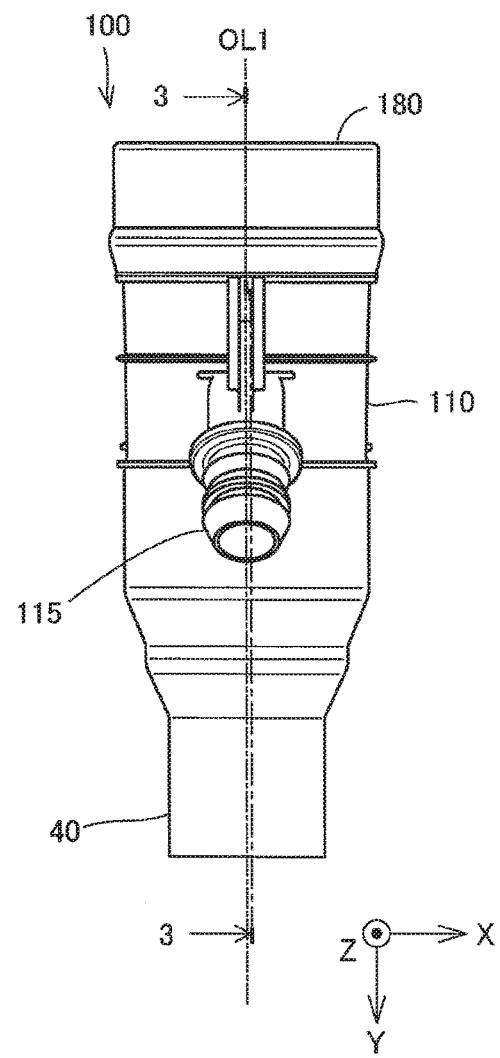
Figure 3:
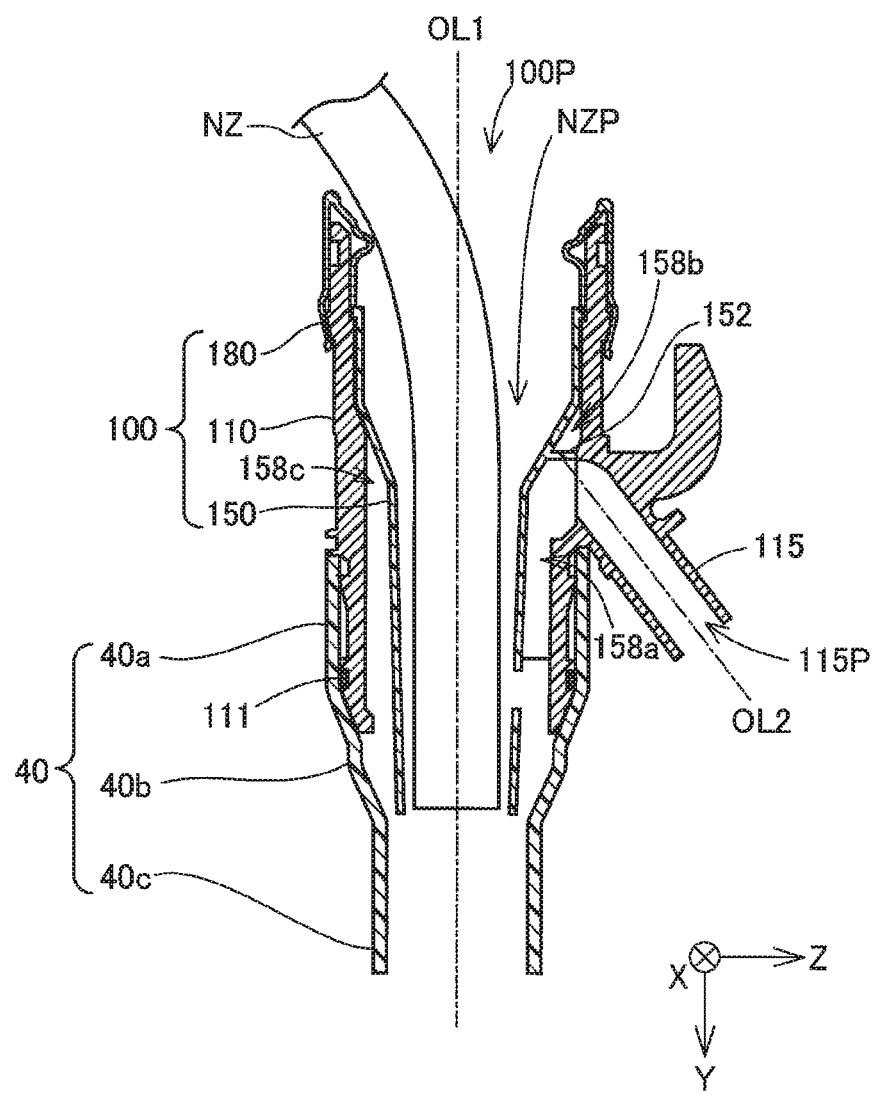
FIG. 3 is a sectional view illustrating the filler neck with which the filler tube is connected.
Figure 4:
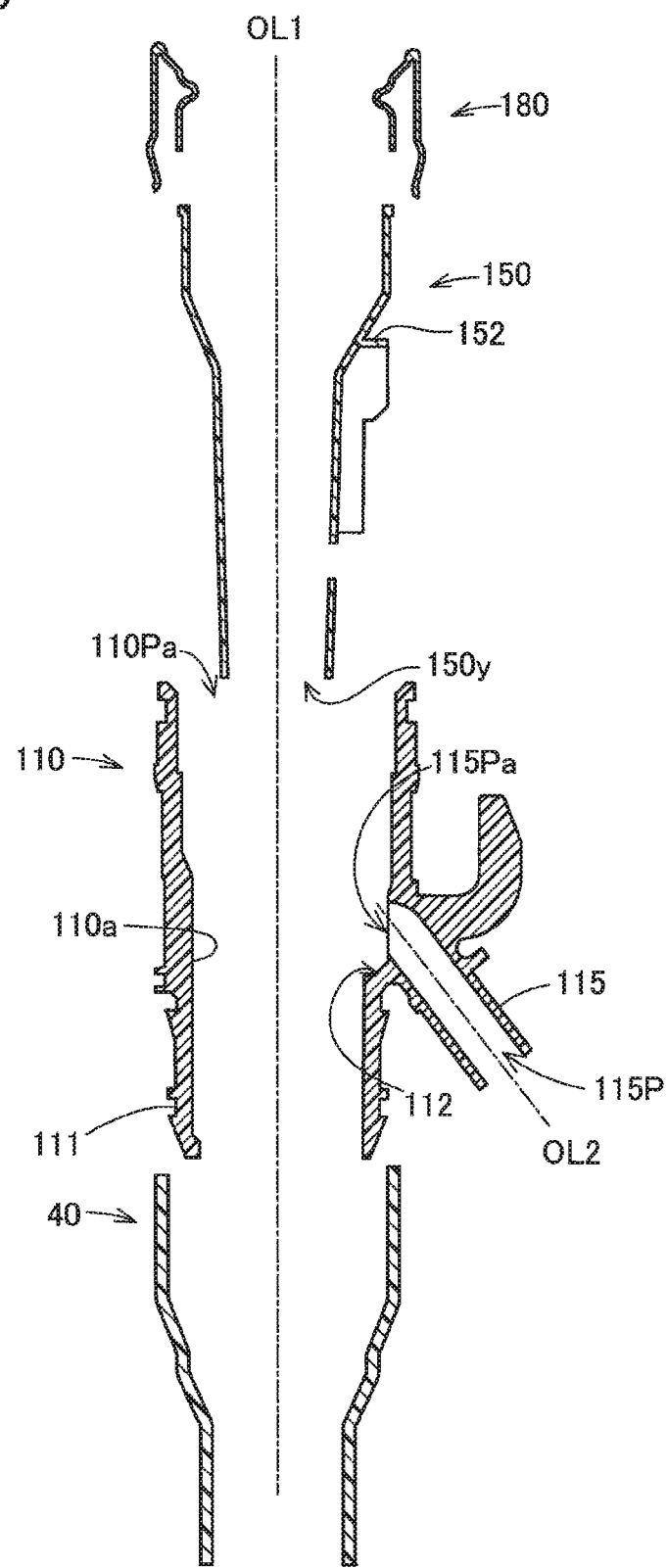
FIG. 4 is an exploded sectional view illustrating the filler tube and the filler neck.

FIG. 2A and FIG. 2B are appearance diagrams illustrating the filler neck 100 with which the filler tube 40 is connected. FIG. 3 is a sectional view illustrating the filler neck 100 with which the filler tube 40 is connected. FIG. 4 is an exploded sectional view illustrating the filler tube 40 and the filler neck 100. More specifically, FIG. 2A is a front view illustrating the filler neck 100 with which the filler tube 40 is connected. FIG. 2B is a right side view illustrating the filler neck 100 with which the filler tube 40 is connected. FIG. 3 is a sectional view illustrating a section M1 in FIG. 2B. FIG. 4 is an exploded sectional view illustrating the respective components in the sectional view of FIG. 3.

As shown in FIG. 3, the filler neck 100 includes a filler neck body 110, a mouthpiece 180 provided to cover an upstream side of the filler neck body 110 and a nozzle guide 150 placed inside of the filler neck body 110. According to this embodiment, the filler tube 40 (connected with the fuel tank FT)-side of the filler neck 100 is called downstream side (positive Y-axis direction in FIG. 2A and FIG. 2B), and the fuel supply side of the filler neck 100 is called upstream side (negative Y-axis direction in FIG. 2A and FIG. 2B). According to this embodiment, the direction from the upstream side to the downstream side of the fuel passage 100P which the fuel supplied to the filler neck 100 passes through is defined as positive Y-axis direction. The direction that is parallel to a plane perpendicular to an axis OL1 passing through the center of the fuel passage 100P and crosses the axis OL1 and an axis OL2 of a breather port 115 described later is defined as positive Z-axis direction. An axis orthogonal to the Y axis and the Z axis is defined as an X axis.

As shown in FIG. 3, the filler neck body 110 is formed in a cylindrical shape along the axis OL1 that connects the upstream side with the downstream side. As shown in FIG. 4, the filler neck body 110 has an inner circumferential surface 110a configured to internally form the fuel passage 100P which the supplied fuel passes through. The sectional area of the fuel passage 100P decreases toward the downstream side. The filler neck body 110 is formed from a resin material. As shown in FIG. 2B and FIG. 3, the filler neck body 110 has a breather port 115 that is branched off in the direction from the upstream side to the downstream side. As shown in FIG. 3 and FIG. 4, the filler neck body 110 has a corrugated portion 111 formed in a corrugated pattern on its outer circumferential surface on the downstream side to allow the filler tube 40 to be press-fit on. As shown in FIG. 4, the filler neck body 110 has a main body step 112 on the downstream side of a joint of the breather port 115 with the filler neck body 110. The main body step 112 comes into contact with a first rib step 153a and a second rib step 154a of the nozzle guide 150 described later to position the nozzle guide 150 located inside of the filler neck body 110 along the axis OL1.

As shown in FIG. 3 and FIG. 4, the breather port 115 of the filler neck body 110 is connected with the breather pipe 50 (shown in FIG. 1) to form an introduction passage 115P that is arranged to introduce the fuel vapor returned from the fuel tank FT through the breather pipe 50 into the fuel passage 100P. As shown in FIG. 4, the introduction passage 115P denotes a space formed about the axis OL2 inside of the breather port 115.

The filler neck 100 is manufactured by placing the nozzle guide 150 inside of the filler neck body 110 and subsequently fitting the mouthpiece 180 at an opening 110Pa of the filler neck body 110.

The mouthpiece 180 is a member provided to cover the circular opening 110Pa on the upstream side of the filler neck body 110. The mouthpiece 180 is made of metal.

As shown in FIG. 3, the nozzle guide 150 is a cylindrical member fit and placed inside of the filler neck body 110. The nozzle guide 150 has an inner circumferential surface arranged to form a nozzle guide path NZP as part of the fuel passage 100P. The inner circumferential surface of the nozzle guide 150 is formed to decrease the sectional area from the upstream side toward the downstream side. The nozzle guide path NZP formed to decrease the sectional area from the upstream side toward the downstream side causes a leading end of the fueling nozzle NZ inserted into the fuel passage 100P to be introduced toward the downstream side of the fuel passage 100P.

As shown in FIG. 3, the nozzle guide 150 has a vapor guide structure 152 configured to cause the fuel vapor that passes through the introduction passage 115P and an introduction opening 115Pa crossing the main body step 112 and is introduced to the filler neck body 110 to be introduced toward the downstream side. The vapor guide structure 152 and the inner circumferential surface 110a of the flier neck body 110 are arranged to connect the introduction passage 115P with the fuel passage 100P and form a vapor flow path 158a as a space causing the introduction passage 115P to communicate with the fuel passage 100P. In other words, the vapor flow path 158a is formed to be continuous with the breather port 115. A space 158b that does not directly communicate with the introduction passage 115P is formed with the vapor guide structure 152 as the boundary on the upstream side of the vapor flow path 158a by the vapor guide structure 152 and the inner circumferential surface 110a of the filler neck body 110. A space 158c is formed by an outer circumferential surface of the nozzle guide 150 and the inner circumferential surface 110a of the filler neck body 110 at a position symmetrical to the vapor flow path 158a (i.e., at a position on the negative Z-axis direction side) with respect to the axis OL1. The vapor flow path 158a, the space 158b and the space 158c are spaces formed by the outer circumferential surface of the nozzle guide 150 and the inner circumferential surface 110a of the filler neck body 110 to communicate with one another by a labyrinthine structure. The labyrinthine structure of this embodiment denotes an intricate structure and more specifically means a structure configured by complicated passages that do not simply communicate with each other by a linear passage. The detailed configuration of the vapor guide structure 152 and the detailed configuration of the vapor flow path 158a will be described later. The vapor guide structure 152 corresponds to the suppression portion in the claims.

As shown in FIG. 3, the filler tube 40 includes a press-fit portion 40a that is press-fit on the corrugated portion 111 of the filler neck 100, a middle portion 40b that is connected with the downstream side of the press-fit portion 40a and an inflow portion 40c that is connected with the downstream side of the middle portion 40b. The middle portion 40b is tapered to decrease the diameter toward the downstream end of the corrugated portion 111 to have the inner diameter approximately equal to the diameter of the inner circumference of the corrugated portion 111 of the filler neck body 110. The inflow portion 40c forms part of the fuel passage 100P that is extended from a lower end 150y of the nozzle guide 150 shown in FIG. 5 to the fuel tank FT and has the diameter equal to the smallest diameter of the middle portion 40b at the lower end 150y of the nozzle guide 150. In other words, the middle portion 40b is protruded toward the downstream side of the corrugated portion 111 to have the diameter larger than the diameter of the inflow portion 40c. The inner circumference of the inflow portion 40c is eccentrically arranged at the lower end 150y of the nozzle guide 150 that is on the lower side in the vertical direction of the vehicle when the fuel supply apparatus FS is mounted on the vehicle, to be smoothly connected with the inner circumference of the filler neck 100 on the opposite side (negative Z-axis direction) to the breather port 115-side. A seal ring (not shown) is placed between the corrugated portion 111 of the filler neck body 110 and the filler tube 40 to prevent leakage of the liquid fuel and the fuel vapor to outside.

(2) Detailed Configuration of Vapor Flow Path 158*a*

Figure 5:
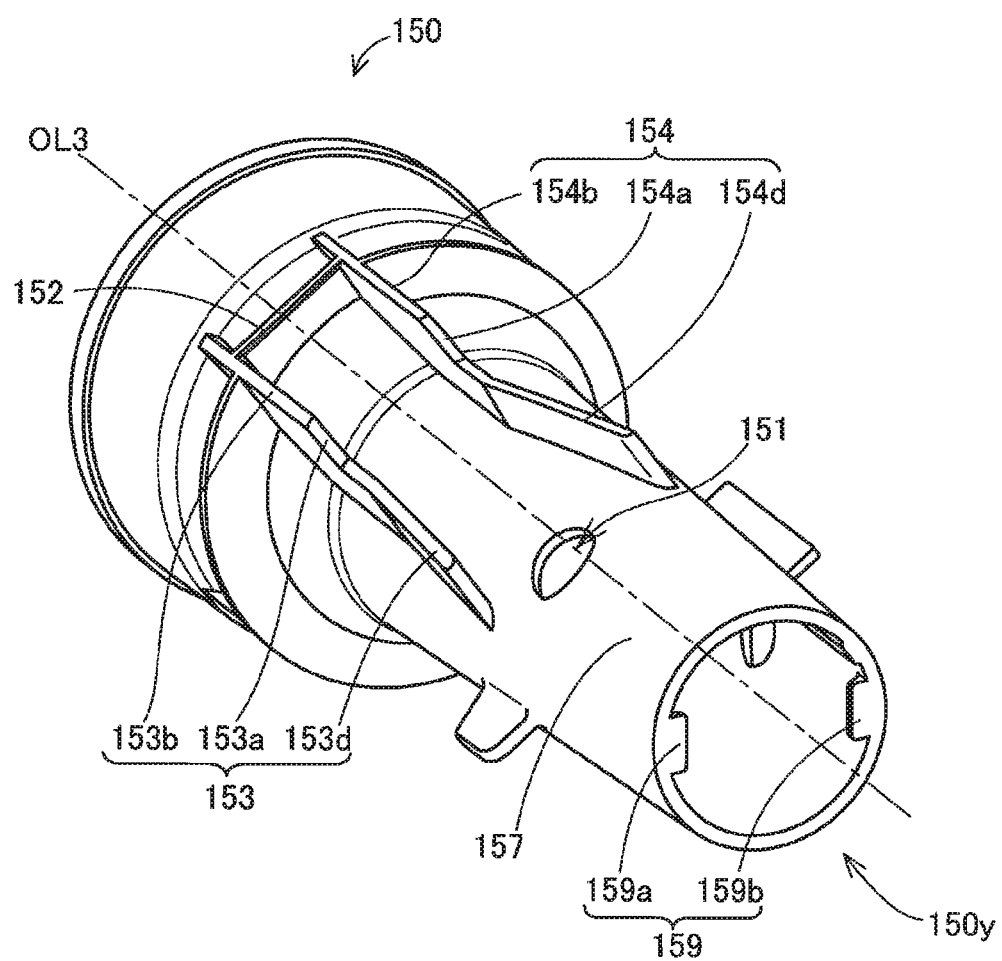
FIG. 5 is a perspective view illustrating a nozzle guide configured to form a vapor flow path.
Figure 6:
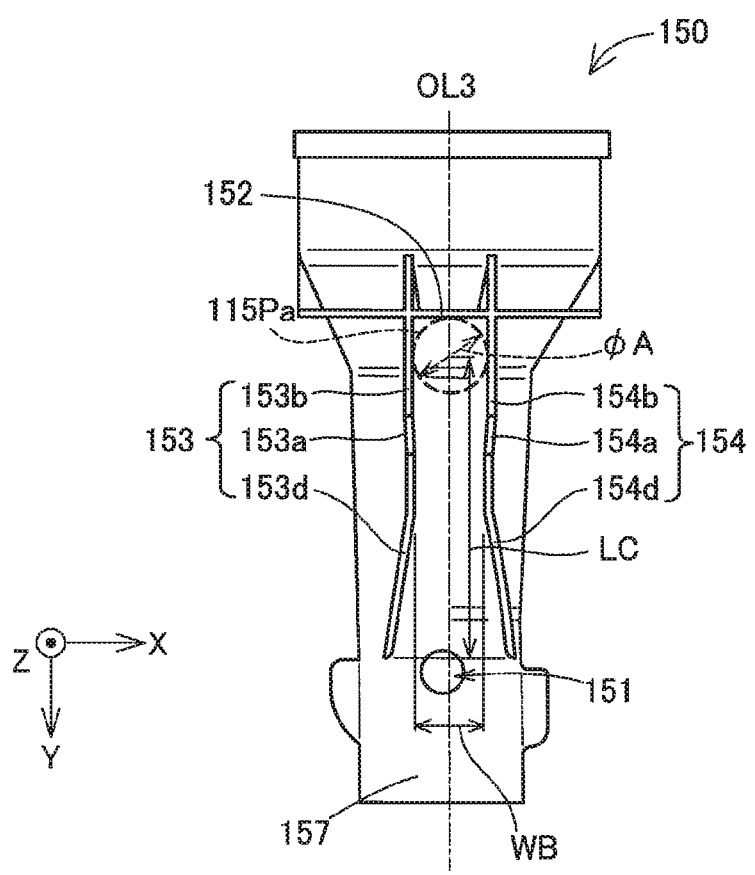
FIG. 6 is a front view illustrating the nozzle guide configured to form the vapor flow path.

FIG. 5 is a perspective view illustrating the nozzle guide 150 configured to form the vapor flow path 158*a*. FIG. 6 is a front view illustrating the nozzle guide 150 configured to form the vapor flow path 158*a*. As described above, the vapor flow path 158*a* is formed by part of the outer surface of the nozzle guide 150 and part of the inner surface of the filler neck body 110. As shown in FIG. 5 and FIG. 6, a first rib 153 and a second rib 154 are formed on the outer surface of the nozzle guide 150 to be connected with the vapor guide structure 152. The first rib 153 and the second rib 154 are protruded along a YZ plane from the outer surface of the nozzle guide 150 to be parallel to each other. The first rib 153 and the second rib 154 are accordingly arranged to be opposed to each other. The vapor guide structure 152 is arranged parallel to a ZX plane, so that the first rib 153 and the second rib 154 are arranged perpendicular to the vapor guide structure 152. The nozzle guide 150 is placed inside of the filler neck body 110, such that the axis OL2 of the breather port 115 is located on a YZ plane passing through an intermediate axis OL3 between the first rib 153 and the second rib 154 opposed to each other. In other words, the position of the nozzle guide 150 is adjusted relative to the filler neck body 110, such that the axis OL2 is located on the plane between the first rib 153 and the second rib 154. The first rib 153 and the second rib 154 are formed in the same shape about the intermediate axis OL3. According to this embodiment, the vapor flow path 158*a* serves to regulate the flow of fuel vapor flowing in from the breather port 115, so that part of an outer circumferential surface 150*a* of the nozzle guide 150 arranged to face the introduction opening 115Pa has no projections such as ribs.

As shown in FIG. 5 and FIG. 6, the first rib 153 includes a first rib step 153*a*, an upstream-side first rib 153*b* located on the upstream side of the first rib step 153*a* and a first rib spread portion 153*d* located on the downstream side of the first rib step 153*a*. The first rib step 153*a*, the upstream-side first rib 153*b* and the first rib spread portion 153*d* are protruded along the intermediate axis OL3 from the outer surface of the nozzle guide 150 to have different amounts of protrusion. The first rib step 153*a* comes into contact with the main body step 112 of the filler neck body 110 when the nozzle guide 150 is placed inside of the filler neck body 110. The first rib step 153*a* is accordingly formed in a shape matching with the main body step 112. The upstream-side first rib 153*b* is formed to have a constant distance from the axis OL1. In other words, the protrusion amount of the upstream-side first rib 153*b* from the outer circumferential surface of the nozzle guide 150 is determined to provide a fixed diameter about the axis OL1. The first rib spread portion 153*d* is formed to widen the vapor flow path 158*a* and to be away from the intermediate axis OL3 toward downstream. The protrusion amount of the first rib spread portion 153*d* from the outer circumferential surface of the nozzle guide 150 is determined to be smaller than the protrusion amount of the upstream-side first rib 153*b*. Neither the first rib 153 nor the second rib 154 (described later) is extended to reach the lower end 150*y* of the nozzle guide 150. A circular hole 151 and a downstream surface 157 as part of the outer circumferential surface of the nozzle guide 150 are provided on the downstream side of a downstream end of the first rib 153 and a downstream end of the second rib 154. The downstream surface 157 has no protrusions such as ribs.

According to this embodiment, the second rib 154 is formed in a symmetrical shape to the first rib 153 about the intermediate axis OL3. Accordingly the second rib 154 includes a second rib step 154*a* in a shape corresponding to the first rib step 153*a*, an upstream-side second rib 154*b* in a shape corresponding to the upstream-side first rib 153*b* and a second rib spread portion 154*d* in a shape corresponding to the first rib spread portion 153*d*.

The first rib step 153*a* and the second rib step 154*a* are configured to come into contact with the main body step 112 of the filler neck body 110. The configuration that the first rib step 153*a* and the second rib step 154*a* come into contact with the main body step 112 regulates the downstream position of the nozzle guide 150 placed inside of the filler neck body 110. In other words, the main body step 112, the first rib step 153*a* and the second rib step 154*a* position the nozzle guide 150 relative to the filler neck body 110 along the axis OL1.

As shown in FIG. 5 and FIG. 6, the circular hole 151 is formed in the nozzle guide 150 on the downstream side of the first rib 153 and the second rib 154. The circular hole 151 is provided perpendicular to the axis OL1 to pass through part of the nozzle guide 150. The circular hole 151 accordingly makes the vapor flow path 158*a* communicate with the fuel passage 100P. The upstream end of the circular hole 151 is located on the upstream side of the downstream ends of the first rib spread portion 153*d* of the first rib 153 and the second rib spread portion 154*d* of the second rib 154. According to this embodiment, a center axis of the circular hole 151 along the axis OL1 is different from the intermediate axis OL3 between the first rib 153 and the second rib 154.

FIG. 6 shows the position of the introduction opening 115Pa of the breather port 115 projected on the outer circumferential surface of the nozzle guide 150 when the nozzle guide 150 is placed inside of the filler neck body 110, in addition to the front view of the nozzle guide 150. FIG. 6 also illustrates the dimensional relationship of the introduction opening 115Pa to the first rib 153 and the second rib 154. The introduction opening 115Pa is in a circular shape and has a diameter of φA. A width WB denotes the distance between the first rib spread portion 153*d* and the second rib spread portion 154*d* and is set to be approximately the same as the diameter φA of the introduction opening 115Pa according to this embodiment. A length LC denotes the distance from the center of the introduction opening 115Pa to the downstream end of the first rib 153 along the intermediate axis OL3 and is set to be greater than the width WB. The outer circumferential surface 150*a* of the nozzle guide 150, the inner circumferential surface 110*a* of the filler neck body 110, the vapor guide structure 152, the first rib 153 and the second rib 154 provided to define the vapor flow path 158*a* according to the first embodiment correspond to the vapor flow path portion in the claims.

(3) Detailed Configuration of Stopper 159

As shown in FIG. 5, stoppers 159 are formed at the lower end 150*y* of the nozzle guide 150 to be protruded inward from the inner circumferential surface of the nozzle guide 150. The stoppers 159 include a first stopper 159*a* and a second stopper 159*b*. The first stopper 159*a* and the second stopper 159*b* are formed to be symmetrical with respect to the axis OL1 of the filler neck body 110 at the lower end 150*y* of the nozzle guide 150 having a circular section. The distance between the first stopper 159*a* and the second stopper 159*b* is set to be smaller than the diameter of the leading end of the fueling nozzle NZ inserted into the filer neck 100 to supply the fuel through the fuel supply apparatus FS. This configuration prevents the leading end of the fueling nozzle NZ inserted into the filler neck 100 during fueling from going beyond the stoppers 159 into the downstream. In other words, the stoppers 159 serve as members to restrict the position of the fueling nozzle NZ inserted into the filler neck 100. Depending on the length and the shape of the fueling nozzle NZ, the leading end of the fueling nozzle NZ inserted into the filler neck 100 may not reach the stoppers 159 of the nozzle guide 150 but may be held in the middle of the nozzle guide 150 before the stoppers 159. Even in the case of such shallow insertion of the fueling nozzle NZ into the nozzle guide 150, the nozzle guide 150 introduces the liquid fuel supplied from the fueling nozzle NZ downstream and serves as an extension of the fueling nozzle NZ.

(4) Functions and Advantageous Effects of First Rib 153 and Second Rib 154

The configuration of the embodiment described above provides the following advantageous effects.

Figure 7:
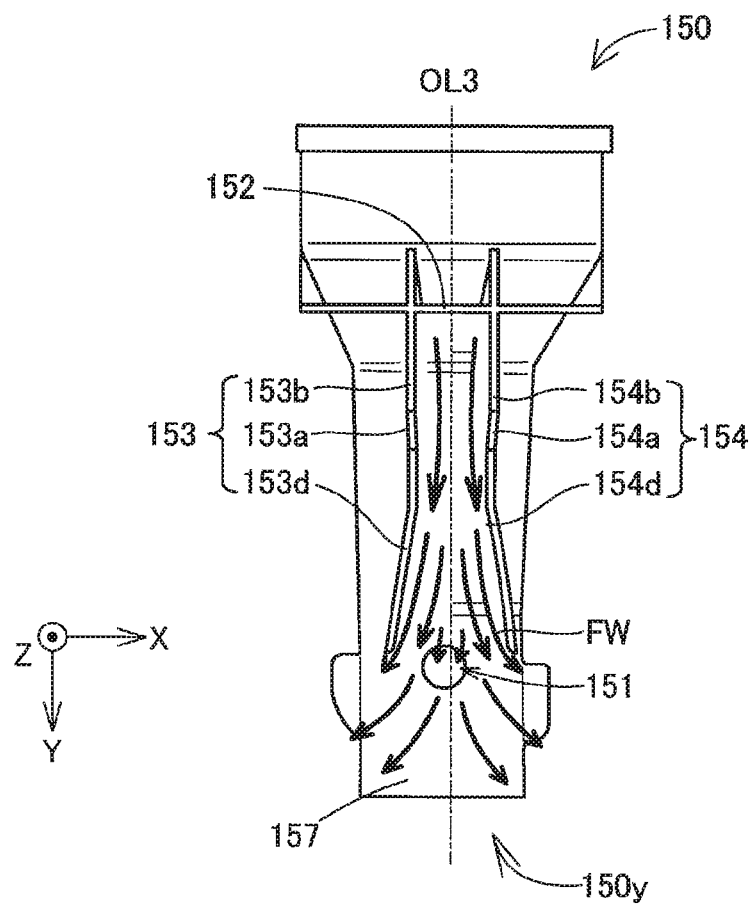
FIG. 7 is a sectional view illustrating a filler neck body and the nozzle guide.

FIG. 7 is a conceptual diagram schematically illustrating the flow of fuel vapor. FIG. 7 illustrates the nozzle guide 150 with flow FW of the fuel vapor that passes through the introduction path 115P of the filler neck body 110, flows into the vapor flow path 158$a$ and is diffused by the first rib spread portion 153$d$ and the second rib spread portion 154$d$. The flow FW of the fuel vapor is shown by a plurality of thick arrows in FIG. 7. The fuel vapor flowing into the vapor flow path 158$a$ is introduced downstream by the vapor guide structure 152. The flow of fuel vapor is regulated and introduced downstream by the upstream-side first rib 153$b$ and the upstream-side second rib 154$b$ arranged to provide the vapor flow path 158$a$ of the fixed width WB. The fuel vapor is then diffused in the circumferential direction by the first rib spread portion 153$d$ and the second rib spread portion 154$d$ arranged to increase the flow passage area of the vapor flow path 158$a$ toward downstream. The flow rate of the diffused fuel vapor is decreased, compared with the flow rate before diffusion. The diffused fuel vapor may pass through the circular hole 151 to join with the fuel passage 100P, may be diffused in the circumferential direction of the nozzle guide 150 and may flow to the lower end 150$y$ of the nozzle guide 150. More specifically the flow of the diffused fuel vapor is adequately slowed down by the first rib spread portion 153$d$ of the first rib 153 and the second rib spread portion 154$d$ of the second rib 154 and subsequently passes through a downstream end of the first rib spread portion 153$d$ and a downstream end of the second rib spread portion 154$d$ to smoothly join with the fuel passage 100P. The fuel vapor also passes through the downstream surface 157 without protrusions such as ribs, so as to be smoothly diffused in the circumferential direction. The first rib spread portion 153$d$ and the second rib spread portion 154$d$ correspond to the slow-down portion in the claims. The upstream-side first rib 153$b$ and the upstream-side second rib 154$b$ correspond to the side wall portion in the claims.

As described above, in the fuel supply apparatus FS of the embodiment, the fuel vapor flowing in through the introduction passage 115P is introduced downstream through the vapor flow path 158$a$ formed to be continuous with the breather port 115. The flow of the introduced fuel vapor is diffused and slowed down by the first rib spread portion 153$d$ and the second rib spread portion 154$d$ and subsequently joins with the liquid fuel that is supplied from the fueling nozzle NZ and flows through the fuel passage 100P. When the fuel vapor introduced downstream has a high flow rate, the fuel supply apparatus FS of the embodiment decreases the flow rate of the fuel vapor before the fuel vapor joins with the liquid fuel supplied from the fueling nozzle NZ. This configuration suppresses the reverse flow of the liquid fuel and outflow of the splash of the liquid fuel from the filler port, due to collision of the fuel vapor having the high flow rate with the liquid fuel. This configuration also suppresses the fuel vapor introduced upstream by the collision of the fuel vapor having the high flow rate with the liquid fuel from flowing out to the atmosphere from the filler port on the upstream side in which the fueling nozzle NZ is inserted.

In the fuel supply apparatus FS of the embodiment, the vapor flow path 158$a$ is formed by the first rib 153, the second rib 154, the vapor guide structure 152, part of the inner circumferential surface 110$a$ of the filler neck body 110 and part of the outer circumferential surface 150$a$ of the nozzle guide 150. The first rib spread portion 153$d$ included in the first rib 153 and the second rib spread portion 154$d$ included in the second rib 154 are formed such as to increase the flow passage area of the vapor flow path 158$a$ in a section perpendicular to the axis OL1 of the nozzle guide 150, toward downstream. In the fuel supply apparatus FS of the embodiment, the flow of the fuel vapor introduced downstream is slowed down by the simple configuration. The first rib 153 including the first rib spread portion 153$d$ and the second rib 154 including the second rib spread portion 154$d$ enhance the strength against an external force applied to the nozzle guide 150.

In the fuel supply apparatus FS of the embodiment, the first rib 153 and the second rib 154 are formed parallel to each other along the axis OL1 of the nozzle guide 150 and are arranged to be opposed to each other. The first rib spread portion 153$d$ and the second rib spread portion 154$d$ are respectively formed on the downstream side of the upstream-side first rib 153$b$ and the upstream-side second rib 154$b$. In the fuel supply apparatus FS of the embodiment, the flow of fuel vapor is introduced downstream by the upstream-side first rib 153$b$ and the upstream-side second rib 154$b$ parallel to each other and is subsequently slowed down by the first rib spread portion 153$d$ and the second rib spread portion 154$d$. This configuration enables the fuel vapor introduced downstream to be appropriately slowed down.

B. Second Embodiment

Figure 8:
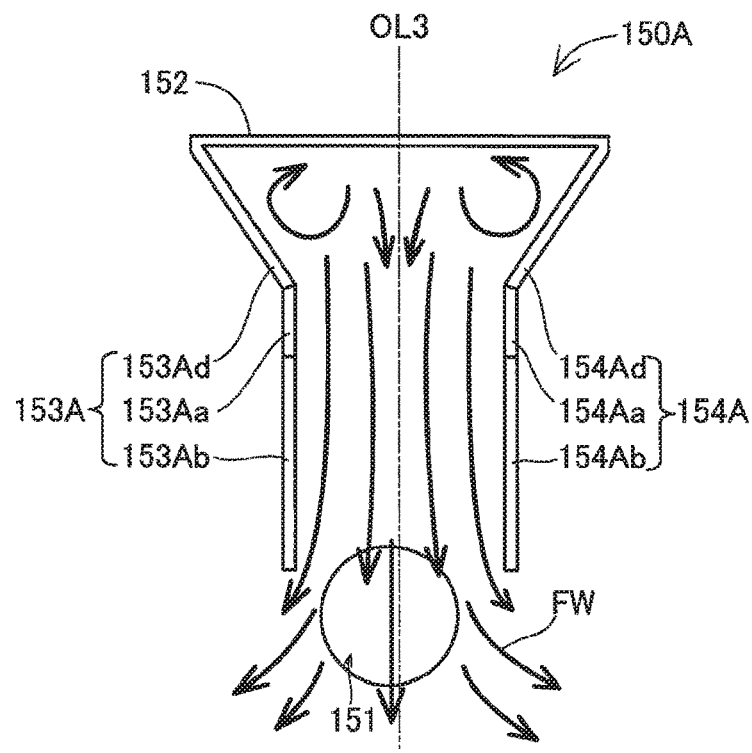
FIG. 8 is a schematic diagram illustrating a first rib and a second rib formed on an outer circumferential surface of a nozzle guide according to a second embodiment.

FIG. 8 is a schematic diagram illustrating a first rib 153A and a second rib 154A formed on an outer circumferential surface 150$a$ of a nozzle guide 150A according to a second embodiment. More specifically FIG. 8 is a front view illustrating a vapor guide structure 152, the first rib 153A and the second rib 154A of the nozzle guide 150A according to the second embodiment. The other configuration of the nozzle guide 150A is omitted from the illustration of FIG. 8. As shown in FIG. 8, the nozzle guide 150A of the second embodiment differs from the nozzle guide 150 of the first embodiment by only the shape of the first rib 153A and the second rib 154A but otherwise has the similar configuration to that of the nozzle guide 150 of the first embodiment. The first rib 153A includes a first rib tapered portion 153Ad located on the upstream side and formed to narrow a vapor flow path 158$a$, a first rib step 153Aa corresponding to the first rib step 153$a$ of the first embodiment and a downstream-side first rib 153Ab located on the downstream side and formed parallel to an intermediate axis OL3. The second rib 154A is formed symmetrically to the first rib 153A about the intermediate axis OL3. The first rib tapered portion 153Ad and a second rib tapered portion 154Ad of the second embodiment correspond to the slow-down portion in the claims. The downstream-side first rib 153Ab and a downstream-side second rib 154Ab correspond to the side wall portion in the claims.

In the fuel supply apparatus FS of the second embodiment, as shown by the flow FW of fuel vapor in FIG. 8, turbulence is generated in the vapor flow path 158a having the flow passage area narrowed by the first rib tapered portion 153Ad and the second rib tapered portion 154Ad, so as to slow down the flow of fuel vapor flowing in through the breather port 115. The slowed-down flow of fuel vapor is regulated and introduced downstream by the downstream-side first rib 153Ab and the downstream-side second rib 154Ab arranged to be opposed to each other. The fuel supply apparatus FS of the second embodiment accordingly enables the fuel vapor to join with the liquid fuel supplied from the fueling nozzle NZ after slowing down the flow of fuel vapor. This configuration suppresses the splash of liquid fuel and the fuel vapor from flowing out to the atmosphere.

C. Third Embodiment

Figure 9:
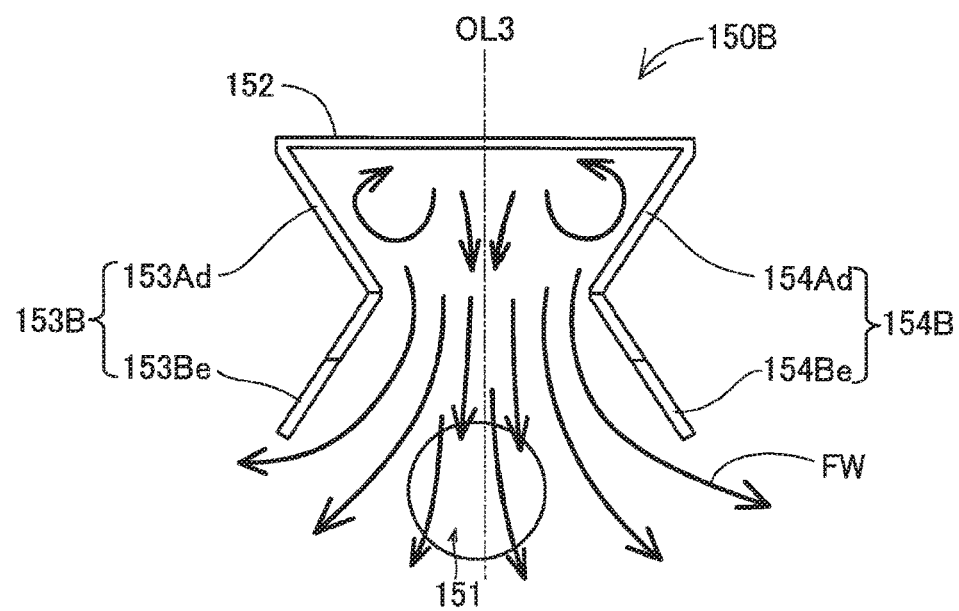
FIG. 9 is a schematic diagram illustrating a first rib and a second rib formed on an outer circumferential surface of a nozzle guide according to a third embodiment.

FIG. 9 is a schematic diagram illustrating a first rib 153B and a second rib 154B formed on an outer circumferential surface 150a of a nozzle guide 150B according to a third embodiment. More specifically, FIG. 9 is a front view illustrating a vapor guide structure 152, the first rib 153B and the second rib 154B of the nozzle guide 150B according to the third embodiment. The other configuration of the nozzle guide 150B is omitted from the illustration of FIG. 9. As shown in FIG. 9, the nozzle guide 150B of the third embodiment differs from the nozzle guide 150A of the second embodiment by only the shape of the first rib 153B and the second rib 154B but otherwise has the similar configuration to that of the nozzle guide 150A of the second embodiment. The first rib 153B includes a down-stream side first spread portion 153Be, in place of the first rib step 153Aa and the downstream-side first rib 153Ab of the first rib 153A of the second embodiment. The downstream-side first spread portion 153Be is formed to increase the flow passage area of a vapor flow path 158a in a section perpendicular to the axis OL1, toward downstream. The second rib 154B is formed symmetrically to the first rib 153B about an intermediate axis OL3. A first rib tapered portion 153Ad and a second rib tapered portion 154Ad of the third embodiment correspond to the upstream-side slow-down portion in the claims. The downstream-side first spread portion 153Be and a downstream-side second spread portion 154Be correspond to the downstream-side slow-down portion in the claims.

In the fuel supply apparatus FS of the third embodiment, as shown by the flow FW of fuel vapor in FIG. 9, turbulence is generated in the vapor flow path 158a having the flow passage area narrowed by the first rib tapered portion 153Ad and the second rib tapered portion 154Ad, so as to slow down the flow of fuel vapor flowing in through the breather port 115. The flow of fuel vapor slowed down and introduced downstream is further slowed down by the downstream-side first spread portion 153Be and the downstream-side second spread portion 154Be provided on the downstream side. The fuel supply apparatus FS of the third embodiment accordingly enables the fuel vapor to join with the liquid fuel supplied from the fueling nozzle NZ after slowing down the flow of fuel vapor. This configuration suppresses the splash of liquid fuel and the fuel vapor from flowing out to the atmosphere.

D. Fourth Embodiment

Figure 10:
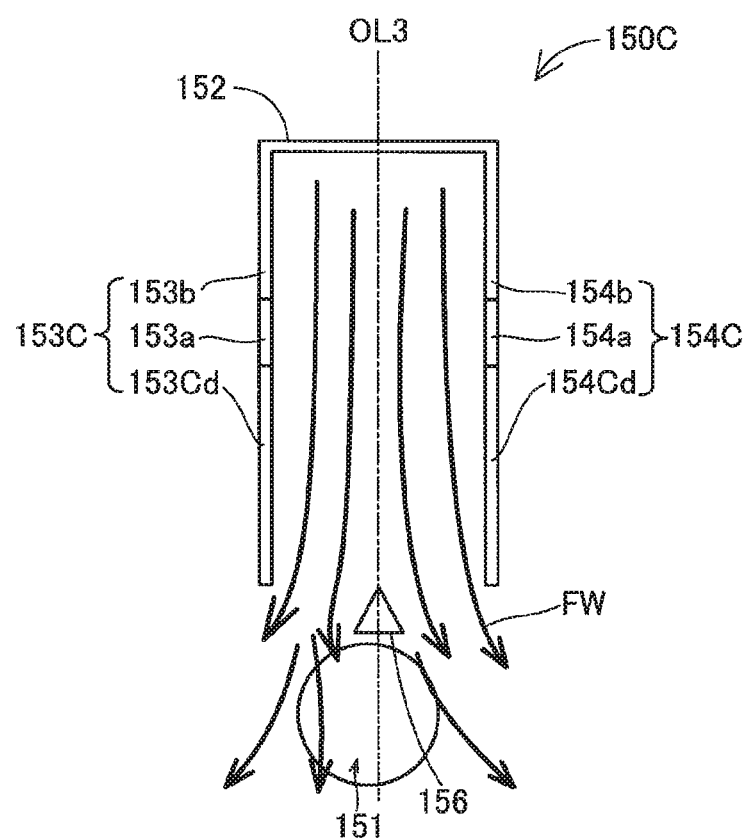
FIG. 10 is a schematic diagram illustrating a first rib and a second rib formed on an outer circumferential surface of a nozzle guide according to a fourth embodiment.

FIG. 10 is a schematic diagram illustrating a first rib 153C and a second rib 154C formed on an outer circumferential surface 150a of a nozzle guide 150 according to a fourth embodiment. More specifically FIG. 10 is a front view illustrating a vapor guide structure 152, the first rib 153C and the second rib 154C of the nozzle guide 150C according to the fourth embodiment. The other configuration of the nozzle guide 150C is omitted from the illustration of FIG. 10. As shown in FIG. 10, the nozzle guide 150C of the fourth embodiment differs from the nozzle guide 150 of the first embodiment by the shape of the first rib 153C and the second rib 154C and the presence of a flow dividing structure 156 but otherwise has the similar configuration to that of the nozzle guide 150 of the first embodiment. The first rib 153C includes a downstream-side first rib 153Cd formed parallel to an intermediate axis OL3, unlike the first rib 153 of the first embodiment. The second rib 154C is formed symmetrically to the first rib 153C about an intermediate axis OL3. This configuration does not change the flow passage area of a vapor flow path 158a defined by the downstream-side first rib 153Cd and a downstream-side second rib 154Cd in a section perpendicular to the axis OL1. This accordingly does not change the flow passage area of the vapor flow path 158a defined by the first rib 153C and the second rib 154C in the section perpendicular to the axis OL1.

As show in FIG. 10, the nozzle guide 150C has the flow dividing structure 156 formed to be protruded from the outer circumferential surface 150a. The flow dividing structure 156 is provided as a triangular convex to increase the area of a section perpendicular to the axis OL1 toward downstream. The flow dividing structure 156 is formed on an intermediate axis OL3 on the lower end side of the first rib 153C and the second rib 154C. In other words, the flow dividing structure 156 is formed between the first rib 153C and the second rib 154C in a plane orthogonal to the axis OL1. The flow dividing structure 156 of the fourth embodiment corresponds to the slow-down portion in the claims.

In the fuel supply apparatus FS of the fourth embodiment, as shown by the flow FW of fuel vapor in FIG. 10, the flow of fuel vapor flowing into the vapor flow path 158a collides with the flow dividing structure 156 to be diffused in the circumferential direction of the filler neck 100 and is accordingly slowed down. The fuel supply apparatus FS of the fourth embodiment accordingly enables the fuel vapor to join with the liquid fuel supplied from the fueling nozzle NZ after slowing down the flow of fuel vapor. This configuration suppresses the splash of liquid fuel and the fuel vapor from flowing out to the atmosphere.

E. Modifications

The disclosure is not limited to the above embodiment but may be implemented by any of various other aspects without departing from the scope of the disclosure. Sonic of possible modifications are given below.

E-1. Modification 1

The configuration of the stoppers 159 provided to position the fueling nozzle NZ inserted into the filler neck 100 is not limited to the above embodiment but may be modified in any of various ways. For example, only the first stopper 159a may be provided. In another example, a net-like separate member may be placed at the lower end 150y of the nozzle guide 150 with a view to positioning the fueling nozzle NZ. In another example, the nozzle guide 150 may not be provided with the stoppers 159 that restrict the position of the fueling nozzle NZ.

E-2. Modification 2

The above first embodiment describes one example of the dimensional relationship with regard to the diameter $\phi A$ of the introduction opening 115Pa, the width WB between the first rib 153 and the second rib 154, and the length LC of the first rib 153 and the second rib 154 along the axis OL1 as shown in FIG. 6. The dimensional relationship may however, be changed in any of various ways. For example, the diameter φA of the introduction opening 115Pa may be different from the width WB between the first rib 153 and the second rib 154. The width WB between the first rib 153 and the second rib 154 is preferably not less than the diameter φA of the introduction opening 115Pa. Additionally, the width WB between the first rib 153 and the second rib 154 is preferably not greater than twice the diameter φA of the introduction opening 115Pa. The width WB between the first rib 153 and the second rib 154 is also preferably smaller than the diameter of the nozzle guide 150 at a section perpendicular to the axis OL1 passing through the center of the introduction opening 115Pa. The length LC of the first rib 153 and the second rib 154 along the axis OL1, is greater than the width WB between the first rib 153 and the second rib 154 according to the above first embodiment but may be not greater than the width WB. The length LC of the first rib 153 and the second rib 154 along the axis OL1 is preferably not less than twice the width WB between the first rib 153 and the second rib 154.

According to the above first embodiment, as shown in FIG. 6, the nozzle guide 150 has the circular hole 151 formed near to the downstream ends of the first rib 153 and the second rib 154. The configuration of the circular hole 151 may however, be changed in any of various ways. The nozzle guide 150 may not have the circular hole 151. The circular hole 151, may be formed in a rectangular shape. The upstream end of the circular hole 151 is located on the upstream side of the downstream ends of the first rib 153 and the second rib 154 according to the above first embodiment but may be located on the downstream side.

The first rib 153 and the second rib 154 are formed in the same shape about the intermediate axis OL3 according to the above first embodiment but may not be necessarily formed in the same shape. For example, the first rib spread portion 153d of the first rib 153 may be shorter along the axis OL1 than the second rib spread portion 154d of the second rib 154. The upstream-side first rib 153b and the upstream-side second rib 154b are arranged to be opposed to each other according to the above first embodiment but may not be necessarily opposed to each other.

E-3. Modification 3

The vapor flow path 158a formed to be continuous with the breather port 115 in the description hereof denotes the vapor flow path 158a provided. as the only flow path to allow the fuel vapor passing through the breather port 115 to flow through without making any branch flow of the fuel vapor. The vapor flow path 158a formed to be continuous with the breather port 115 is not necessarily limited to the vapor flow path 158a as the sealed space but includes a configuration that causes the fuel vapor to be diffused in the circumferential direction via a narrow clearance.

E-4. Modification 4

The configuration of the first rib 153 and the second rib 154 to expand or contract the flow passage area of the vapor flow path 158a is not limited to the configurations described above in the first to the third. embodiments but may be changed in any of various other ways. For example, the second rib spread portion 154d of the second rib 154 shown in FIG. 6 may be formed parallel to the intermediate axis OL3. Even in this modified configuration, the first rib spread portion 153d of the first rib 153 shown in FIG. 6 diffuses and slows down the flow of fuel vapor. The first rib step 153a, the upstream-side first rib 153b, the second rib step 154a and the upstream-side second rib 154b shown in FIG. 6 may be formed to increase the flow passage area of the vapor flow path 158a in the section perpendicular to the axis OL1 toward downstream, like the first rib spread portion 153d and the second rib spread portion 154d. The first rib step 153Aa, the downstream-side first rib 153Ab, the second rib step 154Aa and the downstream-side second rib 154Ab shown in FIG. 8 may be formed to decrease the flow passage area of the vapor flow path 158a in the section perpendicular to the axis OL1 toward downstream, like the first rib tapered portion 153Ad and the second rib tapered portion 154Ad.

The disclosure is not limited to any of the embodiments, the examples and the modifications described above but may be implemented by a diversity of other configurations without departing from the scope of the disclosure. For example, the technical features of any of the embodiments, the examples and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented by aspects described below.

According to one aspect, there is provided a fuel supply apparatus. The fuel supply apparatus comprises a filler neck body including a hollow fuel passage-forming structure configured to form a fuel passage that a supplied fuel passes through, and a fuel vapor port branched off from the fuel passage-forming structure; and a nozzle guide located inside of the filler neck body and formed in a tubular shape to introduce a fueling nozzle that is inserted into a main body opening of the filler neck body and provided to supply the fuel, in a tank direction from the main body opening of the filler neck body toward a fuel tank. The nozzle guide includes a vapor flow path portion configured to introduce fuel vapor flowing into the fuel vapor port in the tank direction. The vapor flow path portion has a slow-down portion configured to slow down the fuel vapor introduced in the tank direction. When the fuel vapor introduced in the tank direction has a high flow rate, the fuel supply apparatus of this aspect decreases the flow rate of the fuel vapor before the fuel vapor joins with the liquid fuel supplied from the fueling nozzle. This configuration suppresses the reverse flow of the liquid fuel and outflow of the splash of the liquid fuel from the filler port, due to collision of the fuel vapor having the high flow rate with the liquid fuel. This configuration also suppresses the fuel vapor introduced to the opposite side in the tank direction by the collision of the fuel vapor having the high flow rate with the liquid fuel from flowing out to the atmosphere from the filler port in which the fueling nozzle is inserted.

In the fuel supply apparatus of the above aspect, two ribs and a suppression portion may be formed on an outer surface of the nozzle guide. The two ribs may be protruded outward with the fuel vapor port placed therebetween, and the suppression portion may be arranged to connect with the two ribs, located on an opposite side to the fuel vapor port in the tank direction and configured to suppress the fuel vapor from flowing toward the opposite side in the tank direction. The vapor flow path portion may be defined by the two ribs, the suppression portion, part of the outer surface of the nozzle guide arranged to connect the two ribs with the suppression portion, and part of an inner surface of the filler neck body. The slow-down portion may be included in at least one of the two ribs and may be configured to increase or decrease a flow passage area of the vapor flow path portion in a section perpendicular to an axis of the nozzle guide. The fuel supply apparatus of this aspect enables the flow of fuel vapor introduced in the tank direction to be slowed down by the simple configuration. The presence of the two ribs enhances the strength against an external force applied to the nozzle guide.

In the fuel supply apparatus of the above aspect, the two ribs may respectively have side wall portions that are formed parallel to each other along the axis of the nozzle guide and are arranged to be opposed to each other. The slow-down portion may be located on a tank direction side of the side wall portions and may be configured to increase the flow passage area of the vapor flow path portion in the section perpendicular to the axis of the nozzle guide. In the fuel supply apparatus of this aspect, the fuel vapor is introduced in the tank direction by the two ribs parallel to each other and is subsequently slowed down by the slow-down portion. This configuration enables the fuel vapor introduced in the tank direction to be appropriately slowed down.

In the fuel supply apparatus of the above aspect, the two ribs may have side wall portions that are formed parallel to each other along the axis of the nozzle guide and are arranged to be opposed to each other. The slow-down portion may be located on an opposite side in the tank direction to the side wall portions and may be configured to decrease the flow passage area of the vapor flow path portion in the section perpendicular to the axis of the nozzle guide. The fuel supply apparatus of this aspect enables the fuel vapor to be slowed down and subsequently join with the liquid fuel supplied from the fueling nozzle. This configuration suppresses the splash of liquid fuel and the fuel vapor from flowing out to the atmosphere.

In the fuel supply apparatus of the above aspect, the slow-down portion may include an upstream-side slow-down portion configured to decrease the flow passage area of the vapor flow path portion in the section perpendicular to the axis of the nozzle guide, and a downstream-side slow-down portion located on a tank direction side of the upstream-side slow-down portion and configured to increase the flow passage area of the vapor flow path portion in the section perpendicular to the axis of the nozzle guide. The fuel supply apparatus of this aspect enables the fuel vapor to be slowed down and subsequently join with the liquid fuel supplied from the fueling nozzle. This configuration suppresses the splash of liquid fuel and the fuel vapor from flowing out to the atmosphere.

In the fuel supply apparatus of the above aspect, two ribs and a suppression portion may be formed on an outer surface of the nozzle guide. The two ribs may be protruded outward with the fuel vapor port placed therebetween. The suppression portion may be arranged to connect with the two ribs, located on an opposite side to the fuel vapor port in the tank direction and configured to suppress the fuel vapor from flowing toward the opposite side in the tank direction. The vapor flow path portion may be defined by the two ribs, the suppression portion, part of the outer surface of the nozzle guide arranged to connect the two ribs with the suppression, portion, and part of an inner surface of the filler neck body. The slow-down portion may be protruded from the outer surface of the nozzle guide, may be configured to increase an area in a section perpendicular to an axis of the nozzle guide, toward the tank direction, and may be located between the two ribs in the section perpendicular to the axis of the nozzle guide. The fuel supply apparatus of this aspect enables the fuel vapor to be slowed down and subsequently join with the liquid fuel supplied from the fueling nozzle. This configuration suppresses the splash of liquid fuel and the fuel vapor from flowing out to the atmosphere.

The disclosure may be implemented by any of various aspects other than the fuel supply apparatus, for example, a motor vehicle equipped with the fuel supply apparatus and a method of manufacturing the fuel supply apparatus.

The invention claimed is:

1. A fuel supply apparatus, comprising:
   a filler neck body including a hollow fuel passage structure configured to form a fuel passage, through which a supplied fuel passes, and a fuel vapor port, which is branched off from the hollow fuel passage structure; and
   a nozzle guide located inside of the filler neck body and formed in a tubular shape to introduce a fueling nozzle that is inserted into a main body opening of the filler neck body and provided to supply the fuel, in a tank direction from the main body opening of the filler neck body toward a fuel tank, wherein
   the nozzle guide includes a vapor flow path portion configured to introduce fuel vapor flowing into the fuel vapor port in the tank direction,
   the vapor flow path portion has a slow-down portion configured to slow down the fuel vapor introduced in the tank direction,
   two ribs and a suppression portion are formed on an outer surface of the nozzle guide, the two ribs being protruded outward with the fuel vapor port placed therebetween and the suppression portion being arranged to connect with the two ribs, located on an opposite side to the fuel vapor port in the tank direction and configured to suppress the fuel vapor from flowing toward the opposite side in the tank direction,
   the vapor flow path portion is defined by the two ribs, the suppression portion, part of the outer surface of the nozzle guide arranged to connect the two ribs with the suppression portion, and part of an inner surface of the filler neck body, and
   the slow-down portion is included in at least one of the two ribs and is configured to increase or decrease a flow passage area of the vapor flow path portion in a section perpendicular to an axis of the nozzle guide.

2. The fuel supply apparatus according to claim 1, wherein
   the two ribs respectively have side wall portions that are formed parallel to each other along the axis of the nozzle guide and are arranged to be opposed to each other, and
   the slow-down portion is located on a tank direction side of the side wall portions and is configured to increase the flow passage area of the vapor flow path portion in the section perpendicular to the axis of the nozzle guide.

3. The fuel supply apparatus according to claim 1, wherein
   the two ribs have side wall portions that are formed parallel to each other along the axis of the nozzle guide and are arranged to be opposed to each other, and
   the slow-down portion is located on an opposite side in the tank direction to the side wall portions and is configured to decrease the flow passage area of the vapor flow path portion in the section perpendicular to the axis of the nozzle guide.

4. The fuel supply apparatus according to claim 1, wherein
   the slow-down portion includes an upstream-side slow-down portion configured to decrease the flow passage area of the vapor flow path portion in the section perpendicular to the axis of the nozzle guide, and a downstream-side slow-down portion located on a tank direction side of the upstream-side slow-down portion and configured to increase the flow passage area of the vapor flow path portion in the section perpendicular to the axis of the nozzle guide.

5. A fuel supply apparatus, comprising:
a filler neck body including a hollow fuel passage structure configured to form a fuel passage, through which a supplied fuel passes, and a fuel vapor port, which is branched off from the hollow fuel passage structure; and
a nozzle guide located inside of the filler neck body and formed in a tubular shape to introduce a fueling nozzle that is inserted into a main body opening of the filler neck body and provided to supply the fuel, in a tank direction from the main body opening of the filler neck body toward a fuel tank, wherein
the nozzle guide includes a vapor flow path portion configured to introduce fuel vapor flowing into the fuel vapor port in the tank direction,
the vapor flow path portion has a slow-down portion configured to slow down the fuel vapor introduced in the tank direction,
two ribs and a suppression portion are formed on an outer surface of the nozzle guide, the two ribs being protruded outward with the fuel vapor port placed therebetween and the suppression portion being arranged to connect with the two ribs, located on an opposite side to the fuel vapor port in the tank direction and configured to suppress the fuel vapor from flowing toward the opposite side in the tank direction,
the vapor flow path portion is defined by the two ribs, the suppression portion, part of the outer surface of the nozzle guide arranged to connect the two ribs with the suppression portion, and part of an inner surface of the filler neck body, and
the slow-down portion is protruded from the outer surface of the nozzle guide, is configured to increase an area in a section perpendicular to an axis of the nozzle guide, toward the tank direction, and is located between the two ribs in the section perpendicular to the axis of the nozzle guide.

* * * * *